United States Patent
Welker et al.

(10) Patent No.: US 8,117,483 B2
(45) Date of Patent: Feb. 14, 2012

(54) METHOD TO CALIBRATE START VALUES FOR WRITE LEVELING IN A MEMORY SYSTEM

(75) Inventors: James A. Welker, Leander, TX (US); Michael P. George, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 521 days.

(21) Appl. No.: 12/465,028

(22) Filed: May 13, 2009

(65) Prior Publication Data

US 2010/0293406 A1 Nov. 18, 2010

(51) Int. Cl.
*G06F 1/00* (2006.01)
*G06F 1/04* (2006.01)
*G06F 1/14* (2006.01)
*G06F 1/24* (2006.01)
*G06F 11/00* (2006.01)
*G06F 1/12* (2006.01)
*G06F 5/06* (2006.01)
*G11C 29/00* (2006.01)

(52) U.S. Cl. ........ 713/500; 713/502; 713/503; 713/600; 714/718

(58) Field of Classification Search .................. 713/500, 713/502, 503, 600; 714/718
See application file for complete search history.

(56) References Cited

U.S. PATENT DOCUMENTS

| | | | |
|---|---|---|---|
| 6,600,681 B1 | 7/2003 | Korger et al. | |
| 6,615,345 B1 | 9/2003 | LaBerge | |
| 6,944,737 B2 | 9/2005 | Ahn | |
| 7,002,378 B2 | 2/2006 | Srikanth et al. | |
| 7,043,652 B2 * | 5/2006 | Matsui | 713/400 |
| 7,257,035 B2 | 8/2007 | Hsieh et al. | |
| 7,382,665 B2 | 6/2008 | Hsieh et al. | |
| 7,694,250 B2 * | 4/2010 | Boutin | 716/106 |
| 2002/0093358 A1 | 7/2002 | Kang | |
| 2002/0184461 A1 * | 12/2002 | Zumkehr | 711/167 |
| 2003/0026162 A1 * | 2/2003 | Matsui | 365/233 |
| 2003/0099149 A1 | 5/2003 | Braun | |
| 2005/0135167 A1 * | 6/2005 | Manabe | 365/201 |
| 2006/0077733 A1 | 4/2006 | Cheng | |
| 2006/0085711 A1 | 4/2006 | Aoki | |
| 2008/0201597 A1 * | 8/2008 | Chong et al. | 713/401 |
| 2010/0008158 A1 * | 1/2010 | Swain et al. | 365/189.07 |
| 2010/0131000 A1 * | 5/2010 | Demello et al. | 606/200 |

OTHER PUBLICATIONS

PCT Search Report for PCT/US2010/031727 mailed Nov. 26, 2010.

* cited by examiner

*Primary Examiner* — Thomas Lee
*Assistant Examiner* — Samantha Hoang
(74) *Attorney, Agent, or Firm* — Rob King; David Dolezal; Charles Bergere

(57) ABSTRACT

A memory controller performs a read test for each of a plurality of memory devices to generate a read delay time of each memory device. There is a prime memory device and a subset of memory devices. For each memory device of the subset, the read delay time for the prime memory device is compared with the read delay time of each memory device of the subset of memory devices to generate a differential delay for each memory device of the subset. For each subset memory device, a write test start time of the prime memory device is combined with a differential delay of each memory device to generate a write test start time for the each memory device. A write test for each memory device uses the write test start time for each subset memory device to generate a write launch time for each subset memory device.

20 Claims, 4 Drawing Sheets

METHOD TO CALIBRATE START VALUES FOR WRITE LEVELING IN A MEMORY SYSTEM

BACKGROUND

1. Field

This disclosure relates generally to semiconductors, and more specifically, to the control of a data strobe signal used by synchronous storage circuitry.

2. Related Art

Synchronous dynamic random access memory (SDRAM) operate synchronously with a system clock in a data processing system. The input and output of the SDRAM are synchronized to an active edge of a system clock. Double data rate (DDR) SDRAMs allow data transfers on both a rising and a falling edge of a clock and thus provide twice as much data as an SDRAM.

Conventional DDR SDRAMs use a bidirectional data strobe signal commonly referred to as a DQS signal. A data strobe receiver receives the DQS signal from either SDRAM or a memory controller and functions to provide the DQS signal so that valid data is centered about DQS transitions meeting setup and hold time requirements of the SDRAM.

For example, DDR SDRAM memory controllers and SDRAM use the DQS strobe signals to send data to the SDRAM (write transfers) and receive data from the SDRAM (read transfers). The DQS data strobe signal functions to capture data as being input or output on each edge of the DQS data strobe signal. It is a requirement of industry standards that data be centered about DQS transitions meeting setup and hold time requirements of the SDRAM for write transfers performed by an SDRAM controller. Industry standards define several states of DQS before, during and after a burst transfer of data. Before a burst transfer of data, DQS is in a high-impedance state that is known as Hi-Z. When DQS is in Hi-Z, DQS is not driven by the memory controller or SDRAM and therefore has an indeterminate voltage level. In a clock cycle before a burst data transfer, DQS transitions from the Hi-Z high-impedance state to a logic low. This logic low state is known as a data strobe preamble. After the data strobe preamble, DQS transitions are used to synchronize the transferred data. At a half clock before the data transfer is complete, DQS remains in a logic low state. This state is known as a data strobe postamble. After completion of the postamble, the DQS data strobe signal again enters the Hi-Z high-impedance state. Because the DQS strobe signal is not driven until the data strobe preamble starts and is stopped at the end of a transaction in the postamble, it is important that a data strobe receiver be turned on and off at the correct time in order to generate a DQS strobe signal with the correct timing. Otherwise indeterminate control signal values may be generated or the DQS strobe signal may oscillate and thereby result in erroneous latching of information.

A well known JEDEC specification for dynamic random access memories (DRAM) is the DDR3 specification, JESD79-3. This specification describes a write leveling sequence that allows the DDR controller to calibrate the launch time of the DQS strobe signal and associated data bits such that they will arrive from the memory controller to the DRAM within a required timing window. This timing window is further described in the JEDEC tDQSS specification to be within plus or minus twenty-five percent of the rising edge of a memory clock. This calibration sequence is especially useful for DDR3 which uses fly-by routing on DDR3 dual in-line memory modules (DIMMS). However, before starting the write leveling sequence, the controller must have the ability to launch (i.e. a start point in time) each DQS strobe signal such that it arrives within a predefined timing window at the DRAM. At slower DDR3 frequencies, it may be possible to have one start point for all DQS strobe signals. However, for higher DDR3 frequencies, each strobe may require a separate start point. To accomplish the start point, each strobe is required to be separately programmed which requires information regarding the physical properties of a memory system and its individual components. Additionally, programming time and effort is required as well as storage for each starting point.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
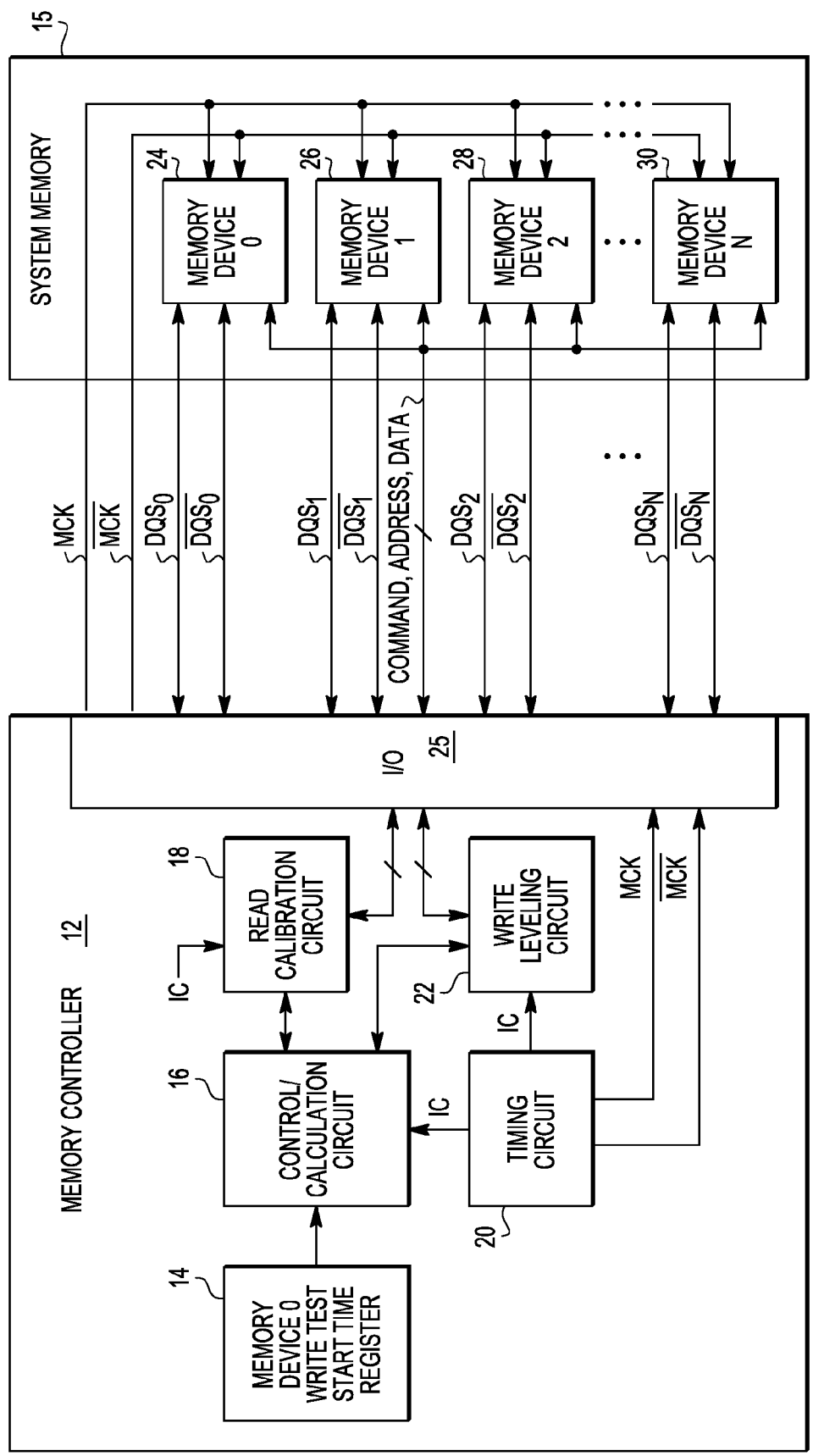
FIG. 1 illustrates in block diagram form an exemplary memory system in accordance with one form of the present invention.

Illustrated in FIG. 1 is an exemplary memory system 10 having a memory controller 12 for controlling communication with a plurality of memory devices in a system memory 15 in accordance with the present invention. The memory controller 12 has a control/calculation circuit 16 having a first input coupled to an output of a register 14 that is a memory device 0 write test start time register. A first input/output terminal of the control/calculation circuit 16 is connected to a first input/output terminal of a read calibration circuit 18. A timing circuit 20 provides an internal clock (IC) signal. A second input of the control/calculation circuit 16 is connected to a first output of a timing circuit 20 for receiving the internal clock (IC) signal from the timing circuit 20. The internal clock (IC) signal is also connected to the read calibration circuit 18. A second output of the timing circuit 20 is connected to an input of a write leveling circuit 22 for providing the IC signal to the write leveling circuit 22. A second input/output of the control/calculation circuit 16 is connected to a first input/output terminal of the write leveling circuit 22. A second input/output terminal of the write leveling circuit 22 is connected to a first input/output terminal of an input/output circuit 25. The write leveling circuit 22 is a write test circuit and functions to perform any of a variety of write tests. It should be understood that the control/calculation circuit 16, in an alternative form, may be connected directly to the I/O circuit 25 for communication with the I/O circuit 25 rather than communication to the I/O circuit 25 via the read calibration circuit 18 and the write leveling circuit 22 as illustrated in FIG. 1. The timing circuit 20 provides a memory clock signal, MCK, and a complement thereof to respective clock inputs of the input/output circuit 25. It should be understood that in an alternative form the memory clock signal, MCK, and its complement memory clock signal could be provided to the respective clock inputs of the input/output circuit 25 by the control/calculation circuit 16. A second input/output terminal of the input/output circuit 25 is connected to a second input/output terminal of the read calibration circuit 18. The input/output circuit 25 has a plurality of input/output terminals coupled to the system memory 15 and clock signal terminals for respectively providing the memory clock MCK and a complement thereof. The system memory 15 has a plurality of memory devices labeled 0, 1, 2, through N, such as memory device 24, memory device 26, memory device 28 and memory device 30. The number of memory devices is any arbitrary number of memory devices as noted by the dots in FIG. 1. It should be understood that as few as two memory devices may be implemented although more devices are show in FIG. 1. Further, each memory device can be the same type of memory or may differ in configuration or data bus width. Data bus widths of 4, 8 and 16 are conventional, but other data bus widths may be used.

As used herein, the term 'memory device' is a memory circuit having a group of memory cells and access circuitry. Each memory device may be implemented as a discrete DRAM integrated circuit in which there is one data strobe signal received and provided (plus the complements thereof). In alternative forms each memory device may be a portion of a memory chip or integrated circuit which has two or more data strobe signals. In an embodiment where multiple memory devices are implemented within a same integrated circuit, each memory device is associated with one data strobe signal.

Each memory device has an input/output terminal or data strobe terminal for bidirectionally communicating data strobe signals, DQSx, where x varies from 0 through N, and an input/output terminal for bidirectionally communicating complementary data strobe signals. Each of memory devices 24, 26, 28 and 30 also has one or more bidirectional and/or unidirectional conductors for communicating command information, address information and data information. Each input/output terminal of the system memory 15 is connected to a respective input/output terminal of the input/output circuit 25. The input/output circuit 25 provides the memory clock, MCK at a first output terminal (the clock signal terminal) that is connected to a first clock input of each of memory devices 24, 26, 28 and 30. The input/output circuit 25 also provides a complement of the memory clock, MCK, at a second output terminal (a second clock signal terminal) that is connected to a second clock input of each of memory devices 24, 26, 28 and 30. Those conductors which are multiple bits wide are illustrated with a slash across the conductor in FIG. 1.

In operation, the memory controller 12 is initially programmed with a write test start point in register 14 for calibrating a first data byte which is the data associated with memory device 24. Although data byte transfers are discussed below, a variety of other data bus widths may be used for the calibration sequence. Memory device 24 will be described below in the context of being a prime memory device within the system memory 15. It should be understood that any memory device of the plurality of memory devices within system memory 15 may be selected as the prime memory device. The other memory devices form a subset of memory devices not including the prime memory device. This write test start point is a point in time in which the DQS strobe signal should be launched to the memory device 24 from memory controller 12 to allow successful write leveling of the data strobe sent to memory device 24. After the memory controller 12 has been initialized, such as executing an initialization routine stored in a boot ROM (not shown), the memory controller 12 will initialize each memory device in system memory 15 pursuant to requirements in the JEDEC specification. Other operations may also be performed pursuant to the JEDEC specification. A command to the DRAM is sent and in response the memory devices 24, 26, 28 and 30 will send DQS and its complement to the memory controller 12. Associated data bits are also sent. A read calibration is performed by the read calibration circuit 18 to determine the total delay for the data strobes and/or associated data to return to the memory controller 12. The control/calculation circuit 16 will use the results from the read calibration circuit 18 to create the start point used by the write leveling circuit 22 when calibrating the memory devices 26, 28 and 30. Further explanation in connection with FIG. 2 will be provided below regarding how the start point is determined to calibrate the memory devices 26, 28 and 30. The write leveling circuit 22 will then proceed with the write leveling sequence for all of the data bytes in system memory 15. Write leveling is a write test which tests the ability of the memory system 10 to accurately write information. A command is issued by the control/calculation circuit 16 of the memory controller 12 to exit the calibration mode. A normal mode of operation for the memory system 10 is then entered by default. The control/calculation circuit 16 functions both as a control circuit and as a calculation circuit for calculating the start point when calibrating the memory devices 26, 28 and 30. It should be apparent that the implementation of the control/calculation circuit 16 may be varied and may use circuitry which separately implements these functions or which shares the implementation of these functions.

Figure 2:
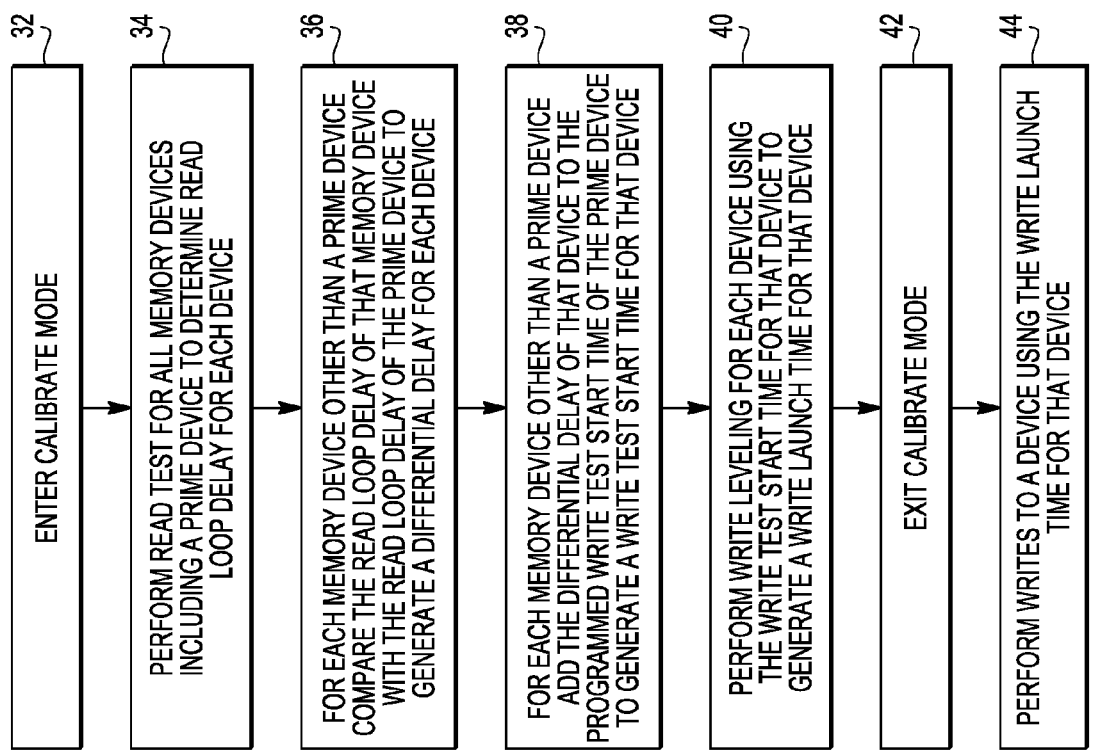
FIG. 2 illustrates in flow chart form an exemplary method to calibrate start values in a memory system in accordance with the present invention.

Illustrated in FIG. 2 is further detail of the calibration mode of the memory controller 12 in accordance with the present invention. The calibrate mode's purpose is to determine launch times for each byte that meet the JEDEC tDQSS specifications for future write commands to any of the memory devices 24, 26, 28 and 30. It should be apparent that system memory 15 may be implemented with multiple ranks of memory where a rank is defined as an independently controlled, chip selectable set of memory devices. In other words if another rank of memory devices was implemented in system memory 15, the additional rank would be separately controlled from memory devices 24, 26, 28 and 30. An additional rank of memory must independently cycle through an independent calibration or use the results of the first memory rank. In a step 32 the calibrate mode is entered. In a step 34 a read test is performed for all memory devices including a prime memory device. The prime memory device is a device that will have a programmed write test start time stored in register 14. In one form the prime memory device is the only device within the system memory 15 that has a programmed write test start time and all other devices have their test start time determined from the write test start time of the prime memory device and the results of a read calibration. In one form the prime memory device is selected to be memory device 24. It should be understood that any memory device within system memory 15 may be selected as the prime memory device. In step 34 the read test determines a read loop delay, or read delay, for each memory device. The loop described herein is any of the individual paths that exist between the memory controller 12 to a respective memory device of system memory 15 and back to the memory controller 12. While the term "loop" is used, no specific geometric shape or configuration is intended or required. In a step 36 for each memory device other than a prime memory device, the read loop delay of that memory device is compared with read loop delay of the prime device to generate a differential delay for each memory device. In a step 38, for each memory device other than the prime memory device the differential delay is added for that memory device to the programmed write test start time of the prime memory device. The combination of the differential delay and the programmed write test start time generates a write test start time for that memory device. It should be understood that for each memory device other than the prime memory device, the differential delay may be either a positive or a negative delay value as variations in processing, temperature and voltage will affect each memory device differently. In a step 40 a write leveling is performed for each memory device using the write test start time for that memory device. The write leveling generates a write launch time for that memory device. The write launch time is the time in which a first edge of the DQS strobe signal should be asserted for future write commands. The complement signal of DQS is also launched at the same time as DQS. Although this description describes rising and falling edges of DQS, the complement signal of DQS is transitioning in the opposite direction. For example, if there is a rising edge of DQS, there is a corresponding falling edge of the complement of DQS. It should also be noted that the complement of MCK is also launched at the same time as MCK, and it will have the opposite transitions as MCK. In a step 42 the calibrate mode of operation is exited and a step 44 is begun. In step 44 write commands to any of the memory devices 24, 26, 28 and 30 within the system memory 15 are made using the write launch time for that memory device. Therefore it should be appreciated that FIG. 2 teaches a method for calibrating per byte (i.e. per memory device) start values and the launch times per byte for future write commands.

Figure 3:
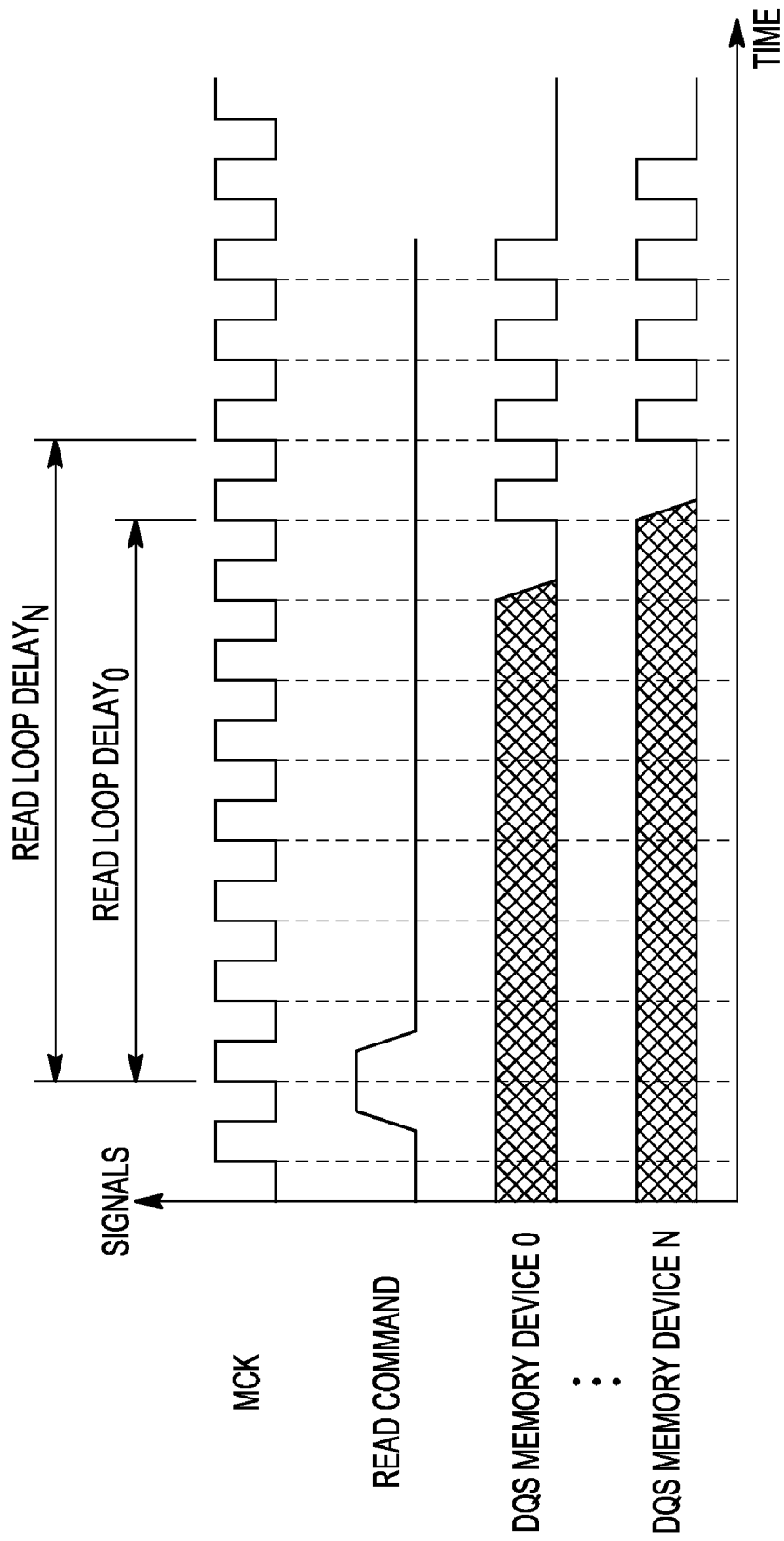
FIG. 3 illustrates in graphical form exemplary signals associated with a read calibration operation in the exemplary memory system of FIG. 1.

Illustrated in FIG. 3 is a timing diagram that illustrates a portion of a read calibration for memory system 10. The memory clock, MCK, is illustrated as a free-running clock. A read command is asserted during an arbitrary cycle of the memory clock. It should be noted that the read command is generated by the memory controller 12 based on a combination of address and control signals to memory devices 24, 26, 28 and 30. On a first rising edge of the memory clock, all address and control signals at the interface between the memory controller 12 and system memory 15 are captured by the memory devices 24, 26, 28 and 30. In one form when the read command is asserted to the memory devices 24, 26, 28 and 30 a read loop delay begins. In another form as illustrated in FIG. 3, the read loop delay begins with the rising edge of the MCK clock signal that captures the read command. There is a travel time associated with the MCK clock signal and the read command to reach each of the memory devices 24, 26, 28 and 30 of system memory 15. After capturing the read command, the memory devices will drive DQS and associated data bits to the memory controller 12 after the read latency and associated MCK and DQS skew has transpired. There is also travel time for the DQS and data bits to go back to the input/output circuit 25 and the read calibration circuit 18 of the memory controller 12. The first rising edge driven by each of the memory devices 24, 26, 28 and 30 determines when the read loop delay ends. The read loop delays can differ as illustrated in FIG. 3 in which the read loop delay for the memory device 30 ends approximately a cycle later than the read loop delay for the prime memory device (e.g. memory device 24). It should be understood that the cycle difference in read loop delays is arbitrary. The difference in read loop delays between memory devices can be any amount of time. In summary, FIG. 3 illustrates the latency associated with the assertion and response to a read command and how the return of the DQS data strobe signal can vary between each memory device in the system memory 15.

Figure 4:
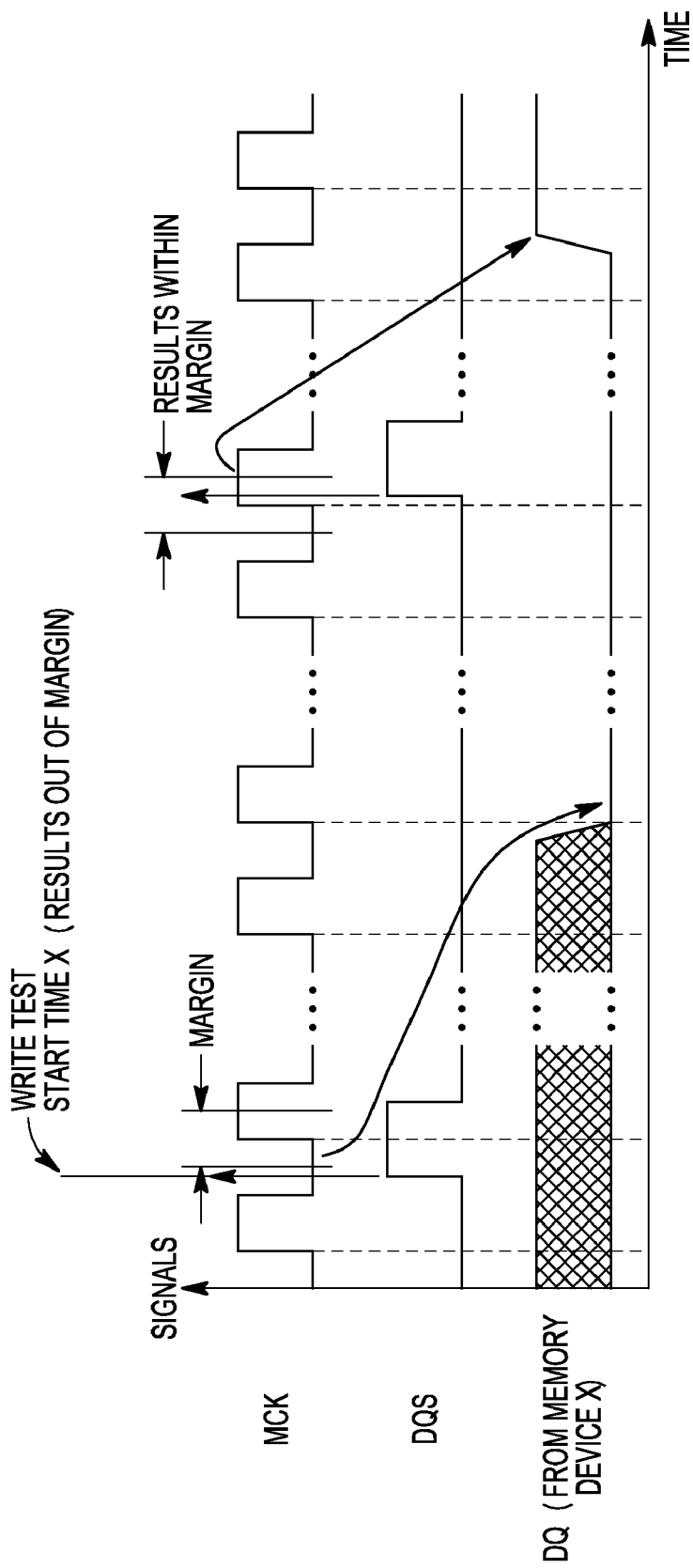
FIG. 4 illustrates in graphical form exemplary signals associated with a write leveling operation in the exemplary memory system of FIG. 1.

Illustrated in FIG. 4 is a timing diagram that illustrates a portion of the JEDEC-defined write leveling process for a memory system such as memory system 10. This timing diagram assumes that the memory devices 24, 26, 28 and 30 of memory system 10 are presently in a write leveling mode of operation. The memory clock, MCK, is again illustrated as a free-running clock. The DQS data strobe must first be asserted within a defined timing window to start the write leveling process. After the first assertion of DQS, a memory device X will respond with a status on the DQ signal. This status represents the value of MCK at the time that DQS is asserted as noted by the arrow in FIG. 4. In this example, MCK is low at the time that DQS is asserted. Thus the memory controller 12 will time shift the DQS signal further out for a subsequent assertion of DQS. The sequencing of DQS signals will continue until the DQ signal is asserted by memory device X, which will signal that DQS has been time shifted past the rising edge of the MCK signal. At this point in time the results are within the desired margin of the rising edge of the MCK signal. Also, at least one of the immediately preceding or subsequently following DQS launch times are also known to be within the desired margin. Either one (or more) of these two successive DQS launch times may be used as the determined DQS launch time for subsequent write operations. After write leveling is complete, the DQS launch time should be calibrated such that it will meet the JEDEC tDQSS specification. It should be understood that this process may occur just reverse to that as shown in FIG. 4. In other words, the first DQS signal may be asserted after the MCK signal has already transitioned to a high level and is sequentially time shifted back until the DQS signal transitions prior to a transition of the MCK signal.

By now it should be appreciated that there has been provided a memory system and method that calibrates on a per byte or per memory device basis specific start values for write leveling. Only one programmed start value is required to be stored in the memory system. By storing only one start value, there is provided a simplified programming model. Only one value must be calculated and programmed which reduces time and complexity for end users of memory system 10. Previously multiple start values had to be stored in a permanent storage device for higher frequency operation. Such values were required to be stored in a boot ROM or other nonvolatile memory or required the use of programmable fuses. This circuitry required programming time by the end user in addition to the time required to determine appropriate values. This circuitry also required additional space and limited the size for other available circuitry. Also, the use of such predetermined multiple start values were limited to specific memory devices in a memory system. If memory upgrades were made or new memory devices substituted in the memory system, the prior start values may no longer be valid. The nonvolatile storage of all start values thus prevents substitute memory devices from being used. The presently disclosed method enables a user to determine or pre-calculate only one start value for a selected or prime memory device. The end user therefore does not need to determine or have any knowledge of signal skews that exist between multiple memory devices in the memory system. The internal circuitry uses a method to calculate all other start times for the other (non-prime) memory devices. Therefore, an end user is freed from having to calculate multiple memory start values that are specific to a given memory device. Additionally, an end user is provided the flexibility of being able to replace memory devices later in use and not risk inoperability due to fixed incorrect start values being programmed in permanent or nonvolatile memory in the system. Thus the programming and board design requirements of an end user implementing a high speed double data rate DRAM interface are simplified with the memory system and method described herein.

There is herein provided in one form a memory controller in which for a group of memory devices, the starting point to validate information is calibrated for all devices except for one memory device. That one memory device, referred to as a prime memory device, has its starting point in which to validate information previously calculated, such as by a board level designer. The starting point to validate information for the other memory devices is calibrated based on the knowledge of skew between the memory devices after a read calibration sequence is performed. To measure the clock signal skew that exists between the various memory devices of the system, a determination is made during reads as to how much delay is present between the various memory devices as read information is returned back to the memory controller 12. It should be understood that the circuitry that is used for determining the clock skew during read operations may be implemented with various types of circuits. By applying an offset (i.e. the clock skew) between the various memory devices to the predetermined start point for a write path, all but one of the start points may be calculated by the memory controller on the fly (i.e. created during a memory controller calibration mode of operation). In the method described herein, a software program may be used to program the starting point of the prime memory device without any knowledge of the clock skew that exists between the other memory devices of the system. Thus, great flexibility for a board level designer is provided. Typically, specific knowledge of all memory device types and memory system specifications is required to calculate starting points for each memory device. Use of the previously calculated start points for all the memory devices thus locks an end user into a very specific memory specification with little ability to change memory devices or layout without re-calculating and restoring new start point values. Additionally, the method described herein permits modifications to the physical layout of a memory system board without negatively impacting the ability to compensate for clock skew that is directly attributable to the routing or placement of the memory devices within the memory system.

In an alternative form various types of DRAM devices may be used. In alternative forms the value provided to register 14 may be stored within the memory system 10 or external to the memory system 10 such as on a disk drive, in nonvolatile memory (including the use of fuses, antifuses or ROM) or the use of resistor encodings. Additionally, various types of logic circuits may be used to implement the disclosed circuits.

In one form there is herein provided a method for operating a memory by performing a read test for each of a plurality of memory devices to generate a read delay time of each of the plurality of memory devices. The plurality of memory devices includes a prime memory device and a subset of memory devices not including the prime memory device, wherein the subset includes at least one memory device. For each memory device of the subset, the read delay time for the prime memory device is compared with the read delay time of the each memory device of the subset of memory devices to generate a differential delay for the each memory device of the subset. For each memory device of the subset, a write test start time of the prime memory device is combined with a differential delay of the each memory device to generate a write test start time for the each memory device. For each memory device of the subset, a write test for the each memory device is performed using the write test start time for the each memory device of the subset to generate a write launch time for the each memory device of the subset. In another form a write test for the prime memory device is performed using the write test start time for the prime memory device to generate a write launch time for the prime memory device. A write operation to each memory device of the subset is performed using the write launch time for each memory device. In one form the write launch time for a memory device is indicative of a timing of a data strobe signal by a memory controller during a write operation to the memory device. In another form the write launch time for a memory device is indicative of a timing of the data strobe signal with reference to a memory clock signal received by the memory device. In another form performing a read test for each of a plurality of memory devices includes a memory controller providing a command signal to the each memory device and measuring a time until receiving a signal from the each memory device in response thereto. In yet another form for each memory device of the subset, the write test start time is indicative of a timing of a signal provided by a memory controller to the each memory of the subset with respect to a memory clock signal provided to the each memory device. In another form the performing a write test for each memory of the subset includes a memory controller providing a series of at least one pulse to the each memory device wherein the write test start time for the each memory device is indicative of a timing of a first pulse of the series with respect to a clock signal provided to the each memory device. In another form performing a write test includes each memory device providing an indication that a pulse is received from the memory controller within a certain phase of the memory clock signal. In yet another form each memory device of the plurality of memory devices is characterized as a DRAM memory device. In another form the delay time for each memory device of the subset is dependent on at least a difference between a length of a clock signal path between a memory controller and the each memory device and a length of a clock signal path between the memory controller and the prime memory device. In another form the performing of the read test, the comparing, the combining, and the performing of the write test are performed by a memory in a calibration mode.

In another form there is provided a memory controller having an I/O circuit including a plurality terminals for exchanging signals with memory devices. A read calibration circuit is provided for determining a read delay for each of a plurality of memory devices from signals received from the memory devices during read tests, the plurality of memory devices including a prime memory device and a set of at least one memory devices not including the prime memory device. A calculation circuit calculates write test start times for the set of at least one memory device, wherein for each memory device of the set, the calculation circuit compares a read delay determined for the each memory device with the read delay of the prime memory device to determine a delay differential and combines the delay differential with a write test start time associated with the prime memory device to generate a write test start time associated with the each memory device. A write leveling circuit determines write launch times for the plurality of memory devices during write tests, wherein for each memory device of the plurality of memory devices, a write test start time associated with the each memory device is used for providing a signal during a write test to determine a write launch time for the each memory device. In one form the memory controller has a clock signal terminal for providing a memory clock signal to the plurality of memory devices. During a write test to determine a write launch time for a memory device of the plurality, the memory controller uses the write test start time associated with the memory device to time a signal provided at a terminal of the plurality of terminals to the memory device with respect to a memory clock signal provided at the clock signal terminal to the memory device. In another form the signal generated during a write test is a differential signal. In yet another form the memory controller has a clock signal terminal for providing a memory clock signal to the plurality of memory devices. During a write test to determine a write launch time for a memory device of the plurality, the memory controller uses the write test start time associated with the memory device to time a first pulse of a series of at least one pulse provided at a terminal of the plurality of terminals to the memory device with respect to a memory clock signal provided at the clock signal terminal to the memory device. In another form the memory controller has a clock signal terminal for providing a memory clock signal to the plurality of memory devices. The memory controller uses a write launch time for a memory device of the plurality of memory devices to time a data strobe signal provided at a terminal of the plurality of terminals for writing data to the memory device with respect to a memory clock signal provided at the clock signal terminal to the memory device. In another form during a read test to a memory device of the plurality of memory devices to determine a read delay, the memory controller transmits a command signal and measures a time delay in receiving a response indicating a receipt of the command signal by the memory device. In yet another form the memory controller further comprises a nonvolatile register for storing a write test start time associated with the prime memory device. In yet another form the plurality of terminals includes a plurality of data strobe terminals each for coupling to a memory device of the plurality of memory devices. The memory controller receives indications, via the plurality of data strobe terminals, from the plurality of memory devices in response to command signals during read tests. The memory controller provides signals on the data strobe terminals for write tests to determine write launch times, and the memory controller provides data strobe signals to the plurality of memory devices during data writes to the plurality of memory devices.

The term "coupled," as used herein, is not intended to be limited to a direct coupling or a mechanical coupling. Although the invention is described herein with reference to specific embodiments, various modifications and changes can be made without departing from the scope of the present invention as set forth in the claims below. For example, various types of transistors may be used to implement the circuits of the memory controller and the memory devices, such as MOS (metal oxide semiconductor), bipolar, GaAs, silicon on insulator (SOI) and others. The amount of power supply voltage reduction can be adjusted according to specific application requirements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for operating a memory comprising:
    performing a read test for each of a plurality of memory devices to generate a read delay time of each of the plurality of memory devices, wherein the plurality of memory devices includes a prime memory device and a subset of memory devices not including the prime memory device, wherein the subset includes at least one memory device;
    for each memory device of the subset, comparing the read delay time for the prime memory device with the read delay time of the each memory device of the subset of memory devices to generate a differential delay for the each memory device of the subset;
    for each memory device of the subset, combining a write test start time of the prime memory device and a differential delay of the each memory device to generate a write test start time for the each memory device of the subset;
    for each memory device of the subset, performing a write test for the each memory device using the write test start time for the each memory device of the subset to generate a write launch time for the each memory device of the subset.

2. The method of claim 1 further comprising:
    performing a write test for the prime memory device using the write test start time for the prime memory device to generate a write launch time for the prime memory device.

3. The method of claim 1 further comprising:
    performing a write operation to each memory device of the subset using the write launch time for the each memory device of the subset.

4. The method of claim 1 wherein the write launch time for a predetermined memory device of the plurality of memory devices is indicative of a timing of a providing of a data strobe signal by a memory controller during a write operation to the predetermined memory device.

5. The method of claim 4 wherein the write launch time for the predetermined memory device is indicative of a timing of the providing of the data strobe signal with reference to a memory clock signal received by the predetermined memory device.

6. The method of claim 1 wherein the performing a read test for each of a plurality of memory devices includes a memory controller providing a command signal to the each memory device of the subset and measuring a time until receiving a signal from the each memory device of the subset in response thereto.

7. The method of claim 1 wherein for each memory device of the subset, the write test start time is indicative of a timing of a signal provided by a memory controller to the each memory device of the subset with respect to a memory clock signal provided to the each memory device of the subset.

8. The method of claim 1 wherein the performing a write test for each memory of the subset includes a memory controller providing a series of at least one pulse to the each memory device of the subset wherein the write test start time for the each memory device of the subset is indicative of a timing of a first pulse of the series with respect to a memory clock signal provided to the each memory device of the subset.

9. The method of claim 8 wherein the performing a write test includes the each memory device of the subset providing an indication that a pulse is received from the memory controller within a certain phase of the memory clock signal.

10. The method of claim 1 wherein each memory device of the plurality of memory devices is characterized as a DRAM memory device.

11. The method of claim 1 wherein the read delay time for each memory device of the subset is dependent on at least a difference between a length of a clock signal path between a memory controller and the each memory device of the subset and a length of a clock signal path between the memory controller and the prime memory device.

12. The method of claim 1 wherein the performing the read test, the comparing, the combining, and the performing the write test are performed by a memory in a calibration mode.

13. A memory controller comprising:
an I/O circuit including a plurality terminals for exchanging signals with a plurality of memory devices;
a read calibration circuit coupled to the I/O circuit for determining a read delay for each of the plurality of memory devices from signals received from the plurality of memory devices during read tests, the plurality of memory devices including a prime memory device and a set of at least one memory device not including the prime memory device;
a calculation circuit coupled to the read calibration circuit for calculating write test start times for the set of at least one memory device, wherein for each memory device of the set, the calculation circuit compares a read delay determined for the each memory device of the set with the read delay of the prime memory device to determine a delay differential and combines the delay differential with a write test start time associated with the prime memory device to generate a write test start time associated with the each memory device of the set; and
a write test circuit coupled to the I/O circuit for determining write launch times for the plurality of memory devices during write tests, wherein for each memory device of the plurality of memory devices, a write test start time associated with the each memory device of the plurality is used for providing a signal during a write test to determine a write launch time for the each memory device of the plurality of memory devices.

14. The memory controller of claim 13 further comprising:
a clock signal terminal for providing a memory clock signal to the plurality of memory devices,
wherein during a write test to determine a write launch time for a memory device of the plurality of memory devices, the memory controller uses the write test start time associated with the memory device to time a signal provided at a terminal of the plurality of terminals to the memory device with respect to the memory clock signal provided at the clock signal terminal to the memory device.

15. The memory controller of claim 13 wherein the signal generated during a write test is a differential signal.

16. The memory controller of claim 13 further comprising:
a clock signal terminal for providing a memory clock signal to the plurality of memory devices,
wherein during a write test to determine a write launch time for a memory device of the plurality of memory devices, the memory controller uses the write test start time associated with the memory device to time a first pulse of a series of at least one pulse provided at a terminal of the plurality of terminals to the memory device with respect to the memory clock signal provided at the clock signal terminal to the memory device.

17. The memory controller of claim 13 further comprising:
a clock signal terminal for providing a memory clock signal to the plurality of memory devices,
wherein the memory controller uses a write launch time for a memory device of the plurality of memory devices to time a data strobe signal provided at a terminal of the plurality of terminals for writing data to the memory device with respect to the memory clock signal provided at the clock signal terminal to the memory device.

18. The memory controller of claim 13 wherein during a read test to a memory device of the plurality of memory devices to determine a read delay, the memory controller transmits a command signal and measures a time delay in receiving a response indicating a receipt of the command signal by the memory device.

19. The memory controller of claim 13 further comprising a nonvolatile register for storing a write test start time associated with the prime memory device.

20. The memory controller of claim 13 wherein the plurality of terminals includes a plurality of data strobe terminals each for coupling to a memory device of the plurality of memory devices, wherein the memory controller receives indications, via the plurality of data strobe terminals, from the plurality of memory devices in response to command signals during read tests, wherein the memory controller provides signals on the plurality of data strobe terminals for write tests to determine write launch times, wherein the memory controller provides data strobe signals to the plurality of memory devices during data writes to the plurality of memory devices.

* * * * *